(12) United States Patent
Malloy et al.

(10) Patent No.: US 6,669,773 B2
(45) Date of Patent: Dec. 30, 2003

(54) FLY ASH/MIXED PLASTIC AGGREGATE AND PRODUCTS MADE THEREFROM

(75) Inventors: Robert Malloy, Londonderry, NH (US); Moshen G. Kashi, Burlington, MA (US); Christopher W. Swan, Needham, MA (US)

(73) Assignee: E³ Innovative Materials, LLC, Burlington, MA (US)

( * ) Notice: Subject to any disclaimer, the term of this patent is extended or adjusted under 35 U.S.C. 154(b) by 0 days.

(21) Appl. No.: 10/132,868

(22) Filed: Apr. 25, 2002

(65) Prior Publication Data
US 2003/0041782 A1 Mar. 6, 2003

Related U.S. Application Data
(60) Provisional application No. 60/287,136, filed on Apr. 27, 2001.

(51) Int. Cl.$^7$ .......................... C04B 18/06; C04B 16/02; C04B 18/30
(52) U.S. Cl. ................. 106/705; 106/405; 106/407; 106/697; 106/708; 106/819; 106/823
(58) Field of Search ................. 106/405, 407, 106/705, 697, 708, 819, 823

(56) References Cited

U.S. PATENT DOCUMENTS

| | | | | | |
|---|---|---|---|---|---|
| 4,624,711 A | * | 11/1986 | Styron | ...................... | 106/405 |
| 5,484,479 A | * | 1/1996 | Weber | ...................... | 106/705 |
| 5,580,378 A | | 12/1996 | Shulman | .................... | 106/677 |
| 5,769,936 A | * | 6/1998 | Mori | ........................ | 106/405 |

* cited by examiner

*Primary Examiner*—Elizabeth D. Wood
(74) *Attorney, Agent, or Firm*—Grossman, Tucker, Perreault & Pfleger, PLLC

(57) ABSTRACT

The present invention is directed at a synthetic lightweight aggregate composition comprising fly ash and a mixture of two or more polymer components. More specifically, the present invention is also directed at a lightweight concrete which cures to a hardened cementious composite comprising Portland cement, water in a weight ratio of between about 0.2 and 0.7 of the water to the Portland cement, synthetic lightweight aggregate in a weight ratio of between about 0.1 and 0.5 of the synthetic lightweight aggregate to the cement, wherein the synthetic lightweight aggregate comprises fly ash and two or more polymer components.

24 Claims, 3 Drawing Sheets

US 6,669,773 B2

FLY ASH/MIXED PLASTIC AGGREGATE AND PRODUCTS MADE THEREFROM

CROSS-REFERENCE TO RELATED APPLICATIONS

This application claims priority to U.S. Provisional Application 60/287,136, filed Apr. 27, 2001.

FIELD OF THE INVENTION

The present invention provides novel compositions for Synthetic Lightweight Aggregates (SLA) and methods for their use in construction applications such as geotechnical lightweight fill, concrete masonry blocks, lightweight concrete structures and asphalt paving. The SLA is produced by melt compounding high concentrations of fly ash from coal into a combination of various thermoplastics. The SLA's are preferably comprised of low or negative value raw materials such as high carbon fly ash and post consumer waste.

BACKGROUND OF THE INVENTION

Landfill space is at a premium and alternatives such as recovery, recycling and reuse of wastes as beneficial products should be strongly encouraged and examined. One potentially strong and viable market is to develop recyclable wastes into granular aggregates, a common material used throughout the construction industry.

The reuse of waste materials in building and highway construction has been a growing phenomenon since the early 1980's. The high demand for construction materials and building products makes them a favorable medium in which to reuse recyclable materials.

Aggregates are used in a variety of building and construction applications. Annually, approximately 2000 million tons of granular material are used in the US. This is the largest quantity of material used in any industry. Almost all aggregates are produced from natural resources such as gravel pits (glaciated), river beds (alluvial), and rock quarries. In addition to depleting these natural resources, mining for aggregates poses serious environmental implications such as the disturbance of natural habitats.

In the context of concrete formulations, aggregates are fine or coarse particles consisting of sands, crushed stones and gravels that are mixed with the cement paste to form a concrete mixture. Most conventional concrete structures are produced using "normal weight" sand and gravel aggregate. However, there are a number of applications where the relatively high specific gravity of the normal weight aggregate is an undesirable characteristic. In applications where a lighter weight concrete is required, the normal weight aggregate may be partially or totally replaced with lower specific gravity or "lightweight" aggregate. Lightweight concrete is commonly used in applications such as concrete masonry units (i.e. concrete blocks) or bridge decks. Lightweight aggregates can be naturally occurring but they are relatively scarce. Most of the lightweight aggregate material that is used for lightweight concrete is "manufactured" by some means. For example, thermal treatment or pyroprocessing of certain naturally occurring minerals can produce an aggregate having a cellular or foam-like structure, hence a lower bulk specific gravity. Expanded clay is an example of a lightweight aggregate. Compared to normal weight aggregate, that usually has a bulk specific gravity greater than 2.6, a lightweight aggregate has a specific gravity less than 2.2. Concrete that is produced using lightweight aggregate will have a lower specific gravity than that produced with normal weight aggregate, but can still have mechanical properties suitable for structural applications.

The concept of using plastic powders or granules as a concrete additive or aggregate is not new. Shuhnan (U.S. Pat. No. 5,580,378) used micronized polystyrene foam particulates (or other plastic particulates) as a lightweight concrete additive. Schroeder in Public Roads, 58 (1994), reports on a study that used HDPE as a partial replacement for fine aggregate in a lightweight concrete mix. The concrete containing the HDPE granules had a lower compressive strength but greater toughness. Large lightweight concrete blocks produced with reground (waste) plastic aggregate are even commercially available.

Likewise, the concepts of using fly ash as an additive (usually as a filler) or as a concrete mineral additive are also not new. Fly ash is a fine ash byproduct commonly produced by the combustion of coal during the generation of electrical power. The fly ash is separated from the hot flue gases before it escapes into the atmosphere. Fly ash is commonly classified as either class C or F (depending on its source-anthracite, bituminous or lignite, subbituminous coal, respectively), and based on its unburned carbon content (ASTM C618 "Fly Ash and Raw or Calcined Natural Pozzolan for Use as a Mineral Admixture in Portland Cement Concrete"). Low carbon fly ash (LCFA) is commonly used as a partial replacement for Portland cement in concrete, or in flowable fill applications. High carbon fly ash, having carbon content greater than about 6%, is much less marketable as a secondary material since free carbon is an undesirable contamination in concrete. Fly ash is also used as a mineral filler in plastics, however, in much smaller volumes than the construction applications described above. The results of many experimental studies conducted with fly ash have shown that the addition of fly ash filler does increase the stiffness of a plastic formulation, but like most fillers, reduces impact resistance. Fly ash offers a significant economic advantage over competing fillers such as calcium carbonate, but does tend to impart a grayish color to the plastic formulation (to a degree dependent on the unburned carbon concentration).

Approximately 29 million tons of plastics (or polymers) are generated annually for use in the US. Close to half of this amount enters the municipal solid waste (MSW) stream with plastics representing upwards to 20% of a MSW landfill's volume. The majority of waste plastics originate from packaging and containers. Most curbside recycling programs in the United States recycle only the polyethlene terephalate (PET) and the high density polyethylene (HDPE) portions of their collected plastics. The plastics that are not recycled (and the portion of the coal combustion byproducts that are not utilized) are landfilled.

Plastic recycling efforts have increased substantially over the last decade but are still insufficient. For example, high density polyethylene (HDPE) is a very common plastic used in making containers such as milk jugs, shampoo bottles and soft drink bottles. However, only 25% of HDPE is recycled, and, worse still, only 1 to 2 percent of all plastics produced are recycled. One factor which influences this recycling rate is the need to separate plastics by type. There are a variety of plastic types (e.g., polypropylene, polystyrene and polyethylene, etc.), however, a mixture of recycled types of plastic will result in a product which exhibits physical and structural behavior inferior to its parent materials. Other factors which contribute to this low recycling rate including the relatively low price of oil (from which plastics are derived), the available recycling market, and the comparative cost for land fill disposal of plastics.

The preferred plastic material for use in the synthetic lightweight aggregate should be available in large quantities such as post consumer wastes which has little or no resale value. The most likely material candidate for such an application is mixed waste plastics from both municipal and industrial waste streams. One possible material source is the relatively low-value post consumer PCCS # 3–7 stream. This material currently has very limited application since any attempt to use different plastic resins together in a melt blending process requires extensive compatibilizers especially if more than two resins are involved. The numbers referred to here are developed by the Society for the Plastic Industry (SPI) in order to assist consumers and sorters at post consumer waste recycling facilities. A number ranging from 1 to 7 inside a recycling symbol has been assigned by the SPI to each of the major plastic resin types and that number is molded onto each plastic product.

A bale of recycle plastics described as PCCS # 3–7 generally consists of many different thermoplastic materials collected as part of a recycling program after many of the HDPE and PET bottles and containers had been removed for recycling. This material is routinely sent to landfills or incinerators by the material recovery facilities as waste.

What is needed is a lightweight aggregate comprising materials of low or negative commercial value which can be combined into materials of construction for building or surfaces and provide equivalent, or in some cases, improved physical properties at reduced weight or specific gravity.

SUMMARY OF INVENTION

The present invention is directed at lightweight synthetic aggregates (SLA's) comprised of various combinations of low or negative value materials, namely fly ash and multi-polymer component mixtures (i.e. two or more polymer components), particularly post consumer plastic waste. When used in construction materials, such as concrete and concrete blocks, geotechnical applications (such as soil) and asphalt surfacing, the result is a reduction in weight with little reduction in properties when compared to the use of a conventional natural resource aggregate. Additionally, a valuable use for low value materials has been created.

With respect to the construction industry and the engineering profession, these new and innovative construction materials may not only be more economically advantageous than traditional (natural) granular materials but may also out-perform them. In addition, the production of this new material allows the recovery and reuse of two large-quantity, raw materials from the waste stream (fly ash and waste plastics), thus, satisfying the goals of sustainable development in which wastes are minimized, their reuse maximized, and natural resources preserved.

It is therefore the object of this invention to provide synthetic lightweight aggregate comprising blends of fly ash and multiple polymer components mixtures in ratios up to 90/10 (fly ash/mixed plastic).

It is a further object to provide useful construction compositions using synthetic lightweight aggregate in soil, concrete and asphalt applications.

It is a still further object of this invention to provide a simple processing method to provide synthetic lightweight aggregate which does not require additional compatibilizing agents in order to handle multiple types of plastics at once.

It is still a further object of the invention to provide a concrete composition using synthetic lightweight aggregate having improved ductility and lower weight.

It is an additional object of this invention to provide a use for low value materials such as high carbon fly ash and post consumer and municipal plastic waste, without having to separate the various plastics by type.

BRIEF DESCRIPTION OF THE DRAWINGS

These and other objects, features and advantages of the invention will become apparent upon consideration of the description of this invention and the appended drawings in which.

Figure 1:
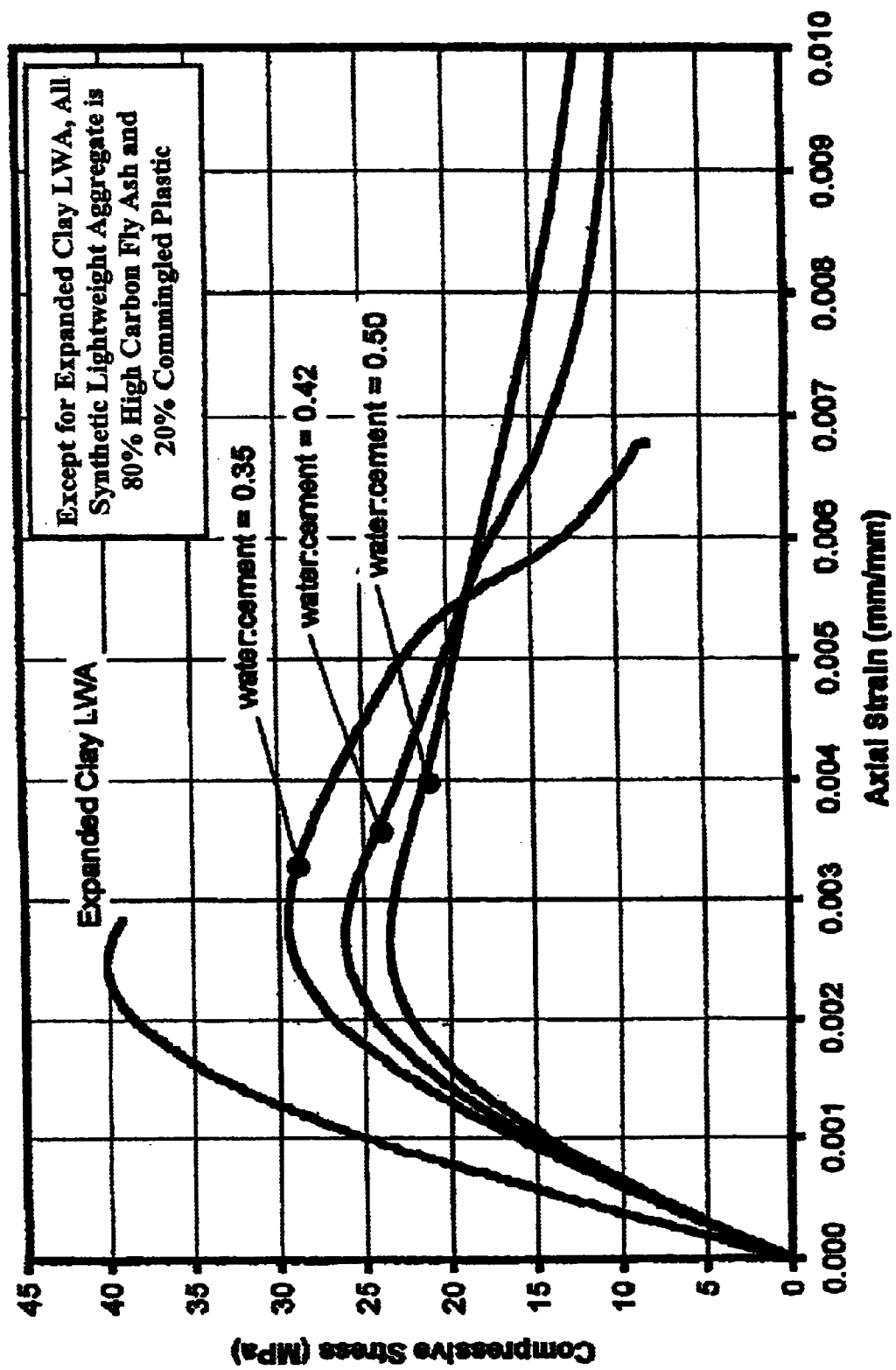
FIG. 1 is a graph showing compressive strength vs. strain for 100 mm dia.×200 mm tall concrete cylinders prepared according to the present invention with expanded clay and SLA aggregate.

The above and other objects, features and advantages of the present invention will be apparent in the following detailed description thereof when read in conjunction with the appended drawings.

DESCRIPTION OF THE PREFERRED EMBODIMENTS

This invention relates to new, lightweight synthetic aggregates and concrete mixes incorporating these aggregates. The lightweight aggregates consist of various ratios (by weight) of fly ash and recycled plastics compounded under heat and pressure. Aggregates with fly ash-to-plastics ratios ranging from 0%:100% to 80%:20% were compounded and tested for specific gravity and particle-size distribution. The aggregates were then incorporated into concrete specimens which were subsequently tested for unit weight and strength. These laboratory tests show that the SLA's possess relatively low specific gravities (<1.3) and were uniform in particle size. Concrete created with these aggregates has values of unit weight and compressive strength similar to those of other lightweight aggregate concretes. More interesting however is that these lightweight aggregate concretes exhibit a beneficial, post-failure ductility; a behavior unique to lightweight, or normal-weight, aggregate concretes.

The fly ash used herein was preferably a "high carbon" type F fly ash (HCFA) supplied by a local coal burning electrical power plant. It had a carbon concentration greater than 6% (wt.), and more particularly, greater than 15% (wt.). The fly ash was melt blended with the thermoplastics at concentrations of 0, 50, and 80 weight percent. The compounding was accomplished using a 30 mm Werner Pfliederer co-rotating intermeshing twin screw extruder equipped with a 50 mm×10 mm flat strip die. Barrel temperatures in the range of 270 degrees C. were used. Only polymer was fed into the primary auger feeder. The fly ash was added through a downstream feed at a concentration of 50%. After cooling, the extrudate was trough cooled and granulated using a conventional rotating knife granulator equipped with a 9 mm screen. The formulations containing 80% HCFA were produced in a second pass by feeding the 50% HCFA compound into primary feeder, and adding the remaining HCFA through the downstream feed port to achieve the 80% HCFA loading. This was once again followed by granulation.

In the broad context of the present invention, the fly ash may also include ammoniated fly ash (i.e., fly ash in combination with ammonia), circulated fluidized bed (CFB) fly ash (fly ash which has undergone a second combustion process to remove excess carbon) and low carbon fly ash.

The economics of SLA production are dictated by the cost of the raw materials used in its production. These applications demand high volume, low cost binder materials. The only realistic candidate binder material for SLA is "mixed plastic waste", such as post consumer PCCS (plastic container code system) classes 3–7 waste that is often landfilled, or other plastic waste streams (automotive fluff as one example) that are currently being landfilled. The PCCS # 3–7 stream is the plastic fraction remaining after PET and HDPE containers have been removed for recycling. Any mix of plastics where the cost or logistics of segregation prevent their reuse are candidate binders for SLA. The specific mixed plastic binder formulation evaluated in this study was loosely based on a post consumer # 3–7 bale analysis. The contents of a post consumer # 3–7 bale were determined item by item (see Table 1). Surprisingly, the bale contained about 30% PET (#1) and 30% HDPE (#2) items that had either slipped through the system or were purposely rejected for a number of possible reasons (contamination etc.).

TABLE 1

| PET (recycled injection BM grade) | 30% |
| HDPE (recycled natural extrusion BM grade) | 30% |
| HDPE (injection molding grade) | 5% |
| LDPE (film extrusion grade) | 10% |
| PP (injection molding grade) | 10% |
| PS (injection molding grade) | 5% |
| HIPS (injection molding grade) | 10% |

Experience has shown that such a "mixture" of largely incompatible thermoplastics would have little practical use as the feed material for conventional products. For example, it would be possible to produce plastic lumber with such a formulation since 55% is polyolefinic, however, the properties obtained with such a formulation would be limited.

In accordance with Table 1 above, the present invention therefore preferably comprises a synthetic lightweight aggregate comprising fly ash and the following polymer components: a thermoplastic polyester (e.g., PET), polyethylene, polypropylene, and polystyrene and polystyrene graft copolymer (e.g. HIPS, high-impact polystyrene). In addition as noted, the polyethylene preferably comprises a mixture of low density polyethylene (density=0.900–0.920 g/cc) and high density polyethylene (density>0.930 g/cc). Furthermore, as alluded to in Table 1, different grades of material may be uniquely utilized, which reflects the utility of the present invention in bringing together otherwise non-compatible polymer materials, of differing molecular weights (viscosities), as reflected by the use of, e.g., injection molding grade, film grade, and recycled grade polymer materials.

In addition to the above, it should be noted that rigid and flexible poly(vinyl chloride) are also found in the plastics waste stream in various concentrations. This is so, as PVC is one of the most widely used plastic materials. SLA mixed plastic formulations containing PVC was therefore produced. Specifically, reground PVC pipe, made from rigid (non-plasticized) PVC was employed in preparation of the SLA formulation. SLA formulations containing PVC that were run at conventional PVC processing temperatures (190–210° C.) did not present any problems.

However, if the mixed plastic waste SLA aggregate (containing PVC) is processed at high temperatures (where all components in the mixed plastic formulation melt), such as 250–270° C., PVC degradation and off-gassing is observed. Melt processing tests were run in this temperature range for mixed plastic formulations containing rigid PVC at concentrations up to 32% (wt.). It was determined that PVC concentrations should preferably be limited to less than about 8.0% (wt.) of the mixed plastic compositions or, as noted, significant off-gassing processing problems are encountered at these high temperatures. Accordingly, in the broad context of the present invention, the SLA herein has uniquely established an upper level of PVC that can be incorporated in the SLA, and run at high temperature, without the off-gassing problems that are encountered in PVC high temperature processing.

Using the concentrations of different plastics commonly found in Table 1, a simulated waste plastic composition was created based roughly on these concentrations. Clean, recycled materials (in 5 mm pellet form) were used where possible; however, some virgin materials were used to make up the mixed thermoplastics formulations. The pellets from each plastic type were weighed according to their concentrations to make one batch of mixture. The thermoplastic materials were put in a large drum. The material was initially hand mixed and then the drum was rolled and tumbled for 15 minutes to get a homogeneous mixture of different thermoplastics materials.

In this case, the mixed plastic formulation is used here to demonstrate the concept of using a multi-polymer component as a binder material for SLA. To obtain compounds with the highest HCFA concentration possible, the process was run at a temperature that was high enough that "all" thermoplastic components melted. Barrel temperatures used for this part of the study were in the 270 degree C. range in order to achieve melting of the PET fraction, higher than optimum for the other materials in the mixture. The usual and mandatory practice of drying PET was not implemented in this study for both process economics and logistical reasons. An HCFA loading level of 80% was used for the mixed plastic SLA. Earlier studies had shown that a loading level in this range resulted in optimum SLA performance as a concrete aggregate. In addition, it was determined that at fly ash concentration of 80%, the physical properties of the SLA are fairly insensitive to the exact composition of the mixed plastic formulation. A mixed plastic formulation containing 0% HCFA was also produced as a control. The resulting material was used to prepare concrete test specimens. Another primary objective here is to create a process (i.e. SLA manufacturing) that is as simple as possible, and capable of handling a wide variety of materials. It is hypothesized and partially proven that the issues of drying, cleanliness, compatibility, surging and the like that are important for most secondary recycling processes, will be much less important in SLA manufacturing.

EXAMPLE 1

The SLA granules manufactured as described above were sieved in order to develop SLA gradations (or granule size distributions) suitable for comparison with conventional lightweight (expanded clay) aggregate. Concrete compressive test cylinders were prepared using both conventional expanded clay aggregate (as a control) and the SLA'S. The test results presented are for compressive strength tests conducted using 100 mm dia.×200 mm cylinders that were cured for 28 days. In each case, only the coarse aggregates were of the lightweight variety. The fine aggregates were conventional normal weight aggregate (natural river sand). A coarse aggregate "volume" fraction of 30% was used for all of the concrete test samples. The concrete formulations were then essentially identical with the exception of the "type" of coarse aggregate used in the mix. The mix proportions for the compressive cylinder data presented in this paper are given in Table 2.

TABLE 2

|  | Expanded Clay | 80% Fly Ash SLA |
|---|---|---|
| Cement to Aggregate ratio | 0.32 | 0.29 |
| Water to Cement ratio | 0.52 | 0.50 |
| Coarse to Fine Aggregate ratio | 0.50 | 0.60 |

The coarse aggregate gradations are given in Table 3.

TABLE 3

| Sieve Size (mm) | Expanded Clay | 80% Fly Ash SLA | Requirement* |
|---|---|---|---|
| 12.70 | 100 | 100 | 100 |
| 9.53 | 98.1 | 100 | 85–100 |
| 4.75 (No. 4) | 30.4 | 30 | 10–30 |
| 2.36 (No. 8) | 6.7 | 0 | 0–10 |
| 1.18 (No. 16) | 1.1 | 0 | 0–5 |
| 0.38 (No. 50) | 0 | 0 | 0 |
| 0.15 (No. 100) | 0 | 0 | 0 |

*ASTM C33 Gradation requirement for size 8 coarse aggregate

The compressive test data in Table 4 and FIG. 1 show how the compressive properties of mixed plastic SLA lightweight concrete compare to that produced with expanded clay lightweight aggregate. In addition, the concrete produced using the 80% fly ash SLA had a number of other attractive properties including very low specific gravity and excellent salt scaling test results. The data shown in Table 4 and plotted in FIG. 1. shows that the mixed plastic/HCFA aggregate can perform quite well relative to conventional expanded clay lightweight aggregate.

TABLE 4

| Coarse Aggregate Type | Water Cement Ratio | Compressive Strength (GPa) | Elastic Modulus (CPa) |
|---|---|---|---|
| Expanded Clay LWA | 0.50 | 42 +/− 1 | 23.5 |
| Mixed Plastic 80% Fly Ash | 0.50 | 22 +/− 1 | 14.5 |
| Mixed Plastic 80% Fly Ash | 0.42 | 26 +/− 1 | 15.5 |
| Mixed Plastic 80% Fly Ash | 0.35 | 30 +/− 1 | 16.0 |

The American Concrete Institute has identified 3 classes of lightweight concrete based on their unit weight and compressive strength. Table 5 presents the approximate 28-day, air-dry unit weight range of 3 types of lightweight aggregate concrete along with the 28-day strength and the use for which each type is generally associated. The ranges given are not precise and should only be used for guidelines.

TABLE 5

|  | Low Density | Class of Concrete Moderate Strength | Structural |
|---|---|---|---|
| Unit Weight (Kglm$_3$) | <800 | 800–1400 | 1400–1850 |
| Compressive Strength (MPa) | 0.69–6.89 | 6.89–17.24 | >17.24 |
| Use | Insulation | Structural Fill | Structural Application |

* ACI 213R-87

By experimenting with various concrete mix ratios (specifically water to cement ratios), it was possible to produce a very lightweight concrete with a 30 MPa compressive strength using a mixed plastic/HCFA SLA. In addition, the concrete was more ductile than that produced with the expanded clay aggregate as evidenced by the stress/strain curve in FIG. 1. The stress-strain response for the SLA concrete exhibited a ductile response (a slow decrease in strength with continued deformation) as opposed to a brittle response (sudden significant loss in strength with continued deformation) seen for the expanded clay aggregate concrete. Visual observation of specimens during and after testing clearly showed that the SLA concrete specimens tended to remain more intact after reaching their peak strength and exhibit limited spalling of concrete with continued straining.

EXAMPLE 2

Masonry blocks are classified by density and by strength. The density classification is given in Table 6 and identifies blocks as being lightweight, medium weight, or normal weight. Minimum strength requirements, given in Table 6, distinguish the blocks' capabilities for use in loadbearing (ASTM C90) or non-loadbearing (ASTM C129) applications.

Solid concrete masonry units are commonly referred to as concrete brick; hollow units are known as hollow blocks, concrete blocks, or cinder blocks. A block's net cross-sectional area is the distinguishing property for characterization as a solid or hollow block. ASTM C1232 defines a hollow unit as having a net cross-sectional area in every plane parallel to the bearing surface less than 75 percent of the cross-sectional area in the same plane. If the net cross-sectional area is greater than 75 percent of the cross-sectional area than the block is classified as a solid unit.

TABLE 6

| Density, kg/m$_3$ (lbs/ft$_3$) | | | Compressive Strength, Mpa (psi) | |
|---|---|---|---|---|
| Light Weight | Medium Weight | Normal Weight | Loadbearing | Non-loadbearing |
| <1680 (105) | 1680–2000 (105–125) | >2000 (125) | 13.1 (1900) | 4.1 (600) |

Two batches of masonry concrete were cast; one using a natural sand and the second with synthetic lightweight aggregate (SLA). The SLA used was made of 80 percent fly ash and 20 percent mixed plastic by weight (80/20 MP). The fly ash had a carbon content of approximately 30 percent and the plastic was from a mixed plastic source. The objectives of the study were to demonstrate that synthetic lightweight aggregates could be used in the production of concrete masonry units (CMU) in a production plant, to establish production and testing procedures for CMU, and to evaluate the physical properties of these CMU's.

Figure 2:
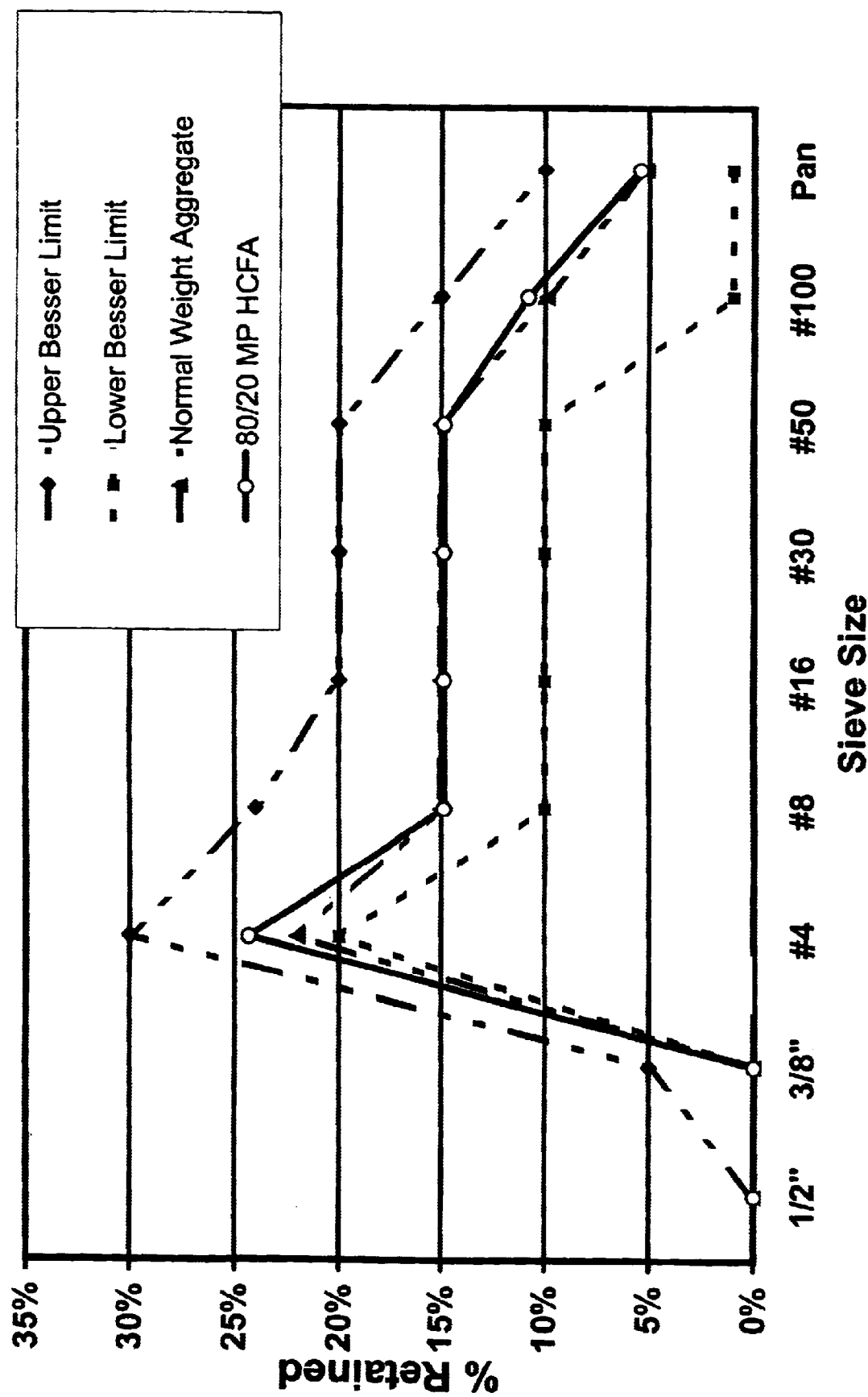
FIG. 2 is a graph showing the range for aggregate gradation or Besser limits and the aggregate size distribution used to make masonry blocks using the present invention.

An optimal aggregate gradation, which fell exactly between the Besser Limits, was adopted and strictly adhered to. This actual gradation, used for the natural sand and the synthetic lightweight aggregate (80/20MP), can be found in FIG. 2. Aggregate properties, such as an aggregate's bulk specific gravity, absorption capacity, and effective absorption, which were considered in the mix design, are presented in Table 7. The coarse fractions of the aggregates used in the casting of the two batches were both classified as a sub-rounded aggregate.

TABLE 7

| PROPERTY | Aggregate Type | |
|---|---|---|
| | Natural Sand | SLA (80:20 MP) |
| Specific Gravity$_{ssd}$ (Bulk) | 2.66 | 1.51 |
| Specific Gravity$_{od}$ (Bulk) | 2.62 | 1.41 |
| Absorption (%) | 1.40 | 6.64 |

The mix ratio for masonry made with natural sand is given in Table 8 and was selected based on the recommendations provided by W. R. Grace Co. The SLA mix ratio was altered to account for the lower density of the aggregate, but was essentially identical by volume to the mix using natural sand.

TABLE 8

| | Natural Sand Block | SLA Block |
|---|---|---|
| Cement-to-Aggregate Ratio | 0.15 | 0.26 |
| Water-to-Cement Ratio | 0.28 | 0.28 |

Figure 3:
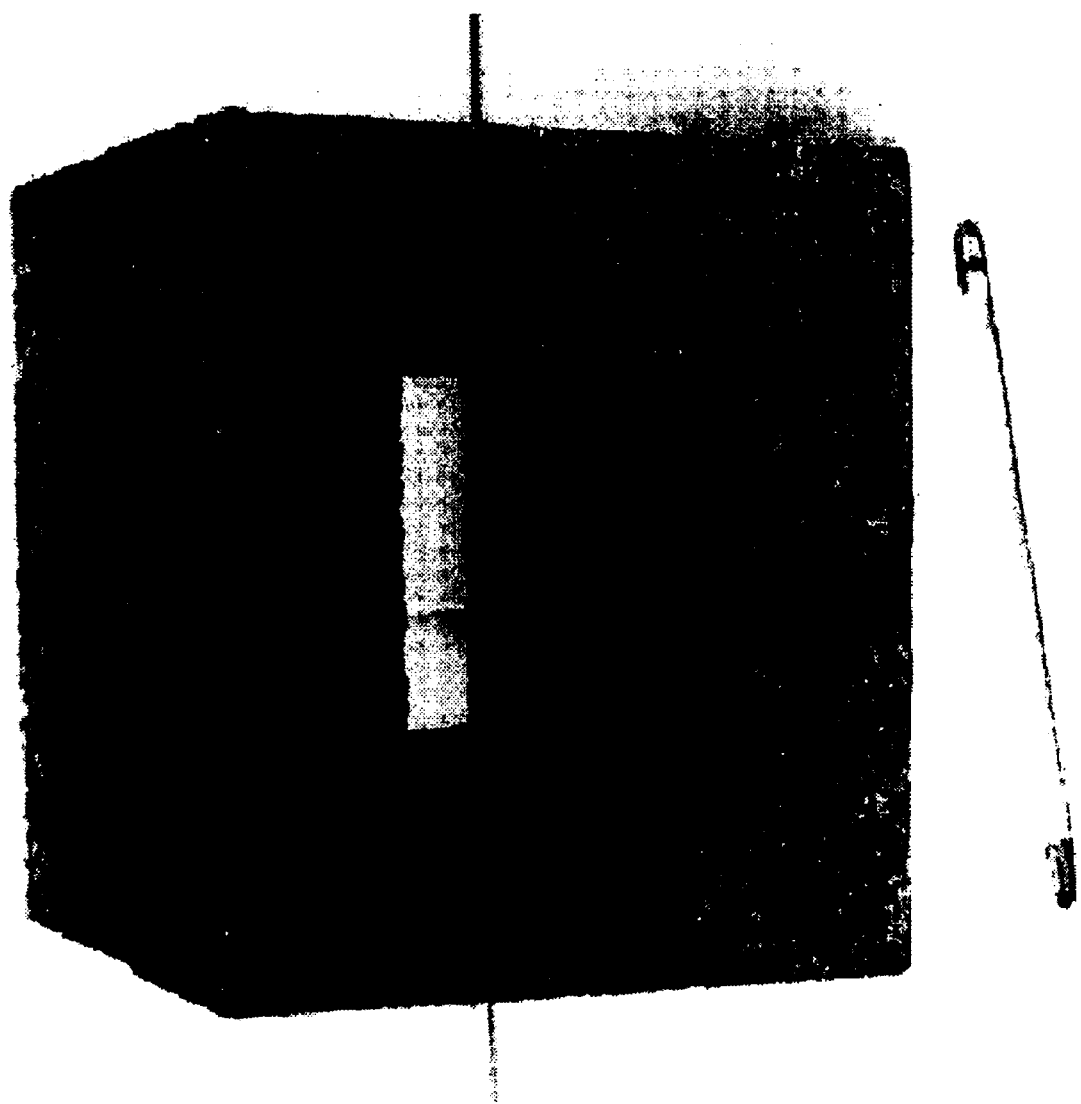
FIG. 3 is a photo of a concrete block made using the present invention.

From each batch, one hollow block with outer dimensions of 8"×8"×7 7/8" (203×203×200 mm) with a center void of 4 1/4"×4 1/4" (108×108 mm) was cast. Once the concrete was placed in the form, 4.5 psi (31 Kpa) of pressure was manually applied through the handles while the entire form was vibrated for a period of 6 seconds. The center void was removed followed by the four sides of the form. From each masonry mix, a 4" diameter (101.5 mm) and 8" long (203.2 mm) solid companion cylinder was also made in disposable plastic molds under identical vibration and pressure conditions. The blocks and cylinders were initially cured in a chamber with 100 percent humidity and a temperature of 100 degrees F. (38 degrees C.) for 24 hours and then placed in an ambient environment for 27 days. A photo of the SLA block is shown in FIG. 3.

The densities and compressive strengths of the companion cylinders were determined per ASTM C140, and test results are given in Table 9.

Using the natural sand, the CMU produced had a density lying within the medium weight range (1680–2000 kg/m3). This was mostly due to the aggregate gradation, amount of water and cement used, and the degree to which the concrete was compacted. The concrete block made with the natural sand did not satisfy the strength criterion for loadbearing block.

The design and the level of manual compaction used to produce CMU units in this study resulted in the units only being strong enough to satisfy the strength requirement for non-loadbearing concrete masonry units. However, the concrete masonry unit produced with the SLA resulted in a decrease in density of 43 percent (well within the requirement for lightweight masonry), and a compressive strength well above the ASTM minimum requirement for non-loadbearing applications (ASTM C129) See Table 5.

TABLE 9

| Unit Type | Density Kg/m$_3$ (lb/ft$_3$) | Compressive Strength Mpa (psi) |
|---|---|---|
| Natural Sand Unit | 1938 (121) | 10.2 (1470) |
| SLA Unit | 1110 (69.1) | 5.5 (800) |

It is anticipated that much better strength results would be obtained with an optimized mix proportion and the use of an automated system of production that subjects the units to much more rigorous level of compaction.

EXAMPLE 3

Synthetic lightweight aggregate (SLA) comprising 80% hydrocarbon fly ash and 20% (by weight) mixed plastics having a PCCS #3–7 polymer distribution (see Table 1) were melt compounded as described earlier, and used as a portion of the aggregate in a hot mix asphalt for paving. The formulation used in shown in Table 10. The evaluation consisted of heating the SLA to a mixing temperatures (155 C., 310 F.), blending with hot virgin mineral aggregates and asphalt binder, compacting, and then saw-cutting the compacted specimens for observation. When heated, although the SLA became soft, the individual particles maintained their shapes and the particle size distribution appeared not to change. The SLA was effectively coated with the asphalt, the asphalt acting as a binder. The mix compacted similar to asphalt paving. After cooling, the SLA particles were observed as hard gray chunks, in a tightly bound, cohesive matrix. No flame treatment of the SLA was required in order to produce a cohesive matrix. The SLA therefore can supplement or replace the mineral aggregate component of such mixtures.

TABLE 10

| Asphalt Binder | 4.0–5.0% (wt.) |
|---|---|
| SLA | 10.0% (wt.) |
| Mineral Aggregate | 85% (wt.) |

In sum, the present invention is directed at the novel and advantageous features of a synthetic lightweight aggregate (SLA). The particle size of the aggregate can preferably range from 0.075 to 9.5 millimeters in size. Bulk specific gravity ranges preferably from 1.3 to 1.9 (ASTM C127 and C128).

Synthetic lightweight aggregates(SLA's) have been produced using high carbon fly ash (HCFA) and various low value commingled or mixed plastic binders. SLA's were produced using several HCFA loading levels, however, those that were produced with an HCFA concentration of 80% have been shown to be most useful as a lightweight aggregate for concrete. Lightweight concrete produced using mixed plastic/HCFA SLA has been produced with a compressive strength as high as 30 MPa. SLA can also be used in non-loadbearing concrete masonry units, i.e. strength greater than 3.45 Mpa (ASTM C129). In addition, the concrete produced with the SLA exhibited a potentially beneficial post-cracking creep or ductility not normally observed in ordinary concrete made with lightweight or normal weight aggregate. Commingled plastics (e.g. commingled plastic waste) of variable composition should be suitable as the binder material for mixed plastic SLA. Properties of the HCFA SLA's are fairly insensitive to the binder composition due to the extremely high filler concentration used to manufacture the SLA's.

The description and drawings illustratively set forth the presently preferred invention embodiments. The description and drawings are intended to describe these embodiments and not to limit the scope of the invention. Those skilled in the art will appreciate that still other modifications and variations of the present invention are possible in light of the above teaching while remaining within the scope of the following claims. Therefore, within the scope of the claims, one may practice the invention otherwise than as the description and drawings specifically show and describe.

We claim:

1. A synthetic lightweight aggregate composition comprising:
   fly ash; and
   two or more polymer components melt blended with said fly ash, said two or more polymer components and said fly ash melt bonded together without the presence of a compatibilizing agent.

2. The synthetic lightweight aggregate of claim 1 wherein said fly ash is selected from the group consisting of fly ash with a carbon content greater than 6% (wt.), ammoniated fly ash, circulated fluidized bed fly ash, or mixtures thereof.

3. The synthetic lightweight aggregate composition in claim 1 wherein the polymer components comprises post consumer plastic waste.

4. The synthetic lightweight aggregate in claim 1 wherein the ratio of fly ash to polymer components ranges from about 10/90 to about 90/10.

5. The synthetic lightweight aggregate of claim 1 wherein said polymer components are selected from the group consisting of poly(ethylene terephthalate), high density polyethylene, low density polyethylene, polypropylene, polystyrene, poly(vinyl chloride) and high impact polystyrene.

6. A synthetic lightweight aggregate comprising fly ash and the following polymer components: a thermoplastic polyester, polyethylene, polypropylene, and polystyrene and polystyrene graft copolymer, wherein said fly ash is melt bonded with said polymer components without the use of a compatiblizing agent.

7. The synthetic lightweight aggregate of claim 6, wherein said thermoplastic polyester comprises poly(ethylene terephthalate).

8. The synthetic lightweight aggregate of claim 6, wherein said polyethylene comprises a mixture of low density polyethylene (density=0.900–0.920 g/cc) and high density polyethylene (density>0.930 g/cc).

9. A lightweight concrete which cures to a hardened cementious composite comprising:
   Portland cement;
   water in a weight ratio of between about 0.2 and 0.7 of the water to the Portland cement;
   synthetic lightweight aggregate in a weight ratio of between about 0.1 and 0.5 of the synthetic lightweight aggregate to Portland cement;
   wherein said synthetic lightweight aggregate comprises fly ash melt blended with said two or more polymer components, thereby melt bonding said fly ash to said polymers without the use of a compatibilizing agent.

10. The lightweight concrete of claim 9 wherein the fly ash is selected from fly ash having a carbon content greater than 6% (wt.), ammoniated fly ash, circulated fluidized bed fly ash, or mixtures thereof.

11. The lightweight concrete of claim 9 wherein the polymer components comprise post consumer plastic waste.

12. The lightweight concrete of claim 9 wherein the ratio of fly ash to polymer components ranges from about 10/90 to about 90/10.

13. The synthetic lightweight aggregate of claim 9 wherein said polymer components are selected from the group consisting of poly(ethylene terephthalate), high density polyethylene, low density polyethylene, polypropylene, polystyrene, poly(vinyl chloride) and high impact polystyrene.

14. An asphalt concrete composition for paving comprising:
    an asphalt binder;
    synthetic lightweight aggregate in a ratio of between about 0.1 and 0.9 of the asphalt/aggregate combination;
    wherein said synthetic lightweight aggregate comprises fly ash melt blended with a mixture of two or more polymer components, thereby binding said fly ash without the use of a compatiblizing agent.

15. The asphalt concrete composition of claim 14 wherein the fly ash is selected from fly ash having a carbon content greater than 6% (wt.), ammoniated fly ash, circulated fluidized bed fly ash, or mixtures thereof.

16. The asphalt concrete composition of claim 14 wherein the mixture of multiple polymer components comprises post consumer plastic waste.

17. The asphalt concrete composition of claim 14 wherein the ratio of fly ash to the mixture of multiple polymer components ranges from about 10/90 to about 90/10.

18. The synthetic lightweight aggregate of claim 14 wherein said polymer components are selected from the group consisting of poly(ethylene terephthalate), high density polyethylene, low density polyethylene, polypropylene, polystyrene, poly(vinyl chloride) and high impact polystyrene.

19. A method of making a synthetic lightweight aggregate comprising:
    providing two or more polymeric materials;
    providing fly ash;
    melt blending said two or more polymeric materials and said fly ash, thereby at least partially melting said two or more polymeric materials and mixing said fly ash with said two or more polymeric materials and melt bonding said fly ash with said two or more polymeric materials without the use of compatiblizing agents;
    cooling said melt blended fly ash and polymeric materials;
    granulating said mixture of fly ash and polymeric materials.

20. The method according to claim 19 wherein melt blending comprises extruding said two or more polymeric materials and said fly ash.

21. The method according to claim 19 wherein said fly ash and said mixture of two or more polymeric materials are provided in a ratio from about 10/90 to about 90/10.

22. The method according to claim 19 wherein said fly ash is selected from the group consisting of fly ash with a carbon content greater than about 6%(wt.), ammoniated fly ash, circulated fluidized bed fly ash, or mixtures thereof.

23. The method according to claim 19 wherein said two or more polymer materials comprise post consumer plastic waste.

24. The method according to claim 19 wherein said two or more polymer materials comprise at least one of poly(ethylene terephthalate), high density polyethylene, low density polyethylene, polypropylene, polystyrene, poly(vinyl chloride) and high impact polystyrene.

* * * * *